(12) United States Patent
Gishboliner

(10) Patent No.: US 11,377,544 B2
(45) Date of Patent: Jul. 5, 2022

(54) POLYPROPYLENE IMPACT COPOLYMERS WITH REDUCED EMISSION OF VOLATILES

(71) Applicant: Carmel Olefins Ltd., Haifa (IL)

(72) Inventor: Michael Gishboliner, Karmiel (IL)

(73) Assignee: Carmel Olefins Ltd., Haifa (IL)

( * ) Notice: Subject to any disclaimer, the term of this patent is extended or adjusted under 35 U.S.C. 154(b) by 184 days.

(21) Appl. No.: 16/967,098

(22) PCT Filed: Oct. 28, 2018

(86) PCT No.: PCT/IL2018/051151
§ 371 (c)(1),
(2) Date: Aug. 3, 2020

(87) PCT Pub. No.: WO2019/162932
PCT Pub. Date: Aug. 29, 2019

(65) Prior Publication Data
US 2021/0047504 A1    Feb. 18, 2021

(30) Foreign Application Priority Data
Feb. 20, 2018  (IL) .......................... 257637

(51) Int. Cl.
| | | |
|---|---|---|
| *C08L 23/16* | (2006.01) | |
| *C08K 5/14* | (2006.01) | |
| *C08K 5/32* | (2006.01) | |
| *C08L 23/12* | (2006.01) | |

(52) U.S. Cl.
CPC ............... *C08L 23/16* (2013.01); *C08K 5/14* (2013.01); *C08K 5/32* (2013.01); *C08L 23/12* (2013.01); *C08L 2203/30* (2013.01); *C08L 2205/025* (2013.01); *C08L 2207/02* (2013.01); *C08L 2314/02* (2013.01); *C08L 2314/06* (2013.01)

(58) Field of Classification Search
CPC .................... C08L 2207/02; C08L 2205/03
See application file for complete search history.

(56) References Cited

U.S. PATENT DOCUMENTS

| | | |
|---|---|---|
| 9,890,274 B2 | 2/2018 | Wang et al. |
| 2006/0173132 A1 | 8/2006 | Mehta et al. |
| 2017/0137544 A1 | 5/2017 | Bercx et al. |
| 2018/0155536 A1 | 6/2018 | Lecouvet et al. |

FOREIGN PATENT DOCUMENTS

| | | |
|---|---|---|
| CA | 2 964 654 | 5/2016 |
| CA | 3 003 740 | 5/2017 |
| CN | 102803375 | 11/2012 |
| EP | 2144962 | 1/2010 |
| EP | 3 260 489 | 12/2017 |
| WO | WO 2009/124753 | 10/2009 |
| WO | WO 2010/149549 | 12/2010 |
| WO | WO 2012/049204 | 4/2012 |
| WO | WO 2014/044680 | 3/2014 |
| WO | WO 2017/220556 | 12/2017 |
| WO | WO 2018/108835 | 6/2018 |
| WO | WO 2018/108929 | 6/2018 |
| WO | WO 2018/114977 | 6/2018 |
| WO | WO 2018/114979 | 6/2018 |
| WO | WO 2018/122293 | 7/2019 |

OTHER PUBLICATIONS

International Search Report and Written Opinion issued for International Application No. PCT/IL2018/051151 dated Jan. 21, 2019.
Extended European Search Report issued for European Application No. 18906779.6 dated Oct. 20, 2021.

*Primary Examiner* — Jeffrey C Mullis
(74) *Attorney, Agent, or Firm* — Klarquist Sparkman, LLP

(57) ABSTRACT

The invention provides polypropylene impact copolymer compositions with reduced emissions of volatiles for the automotive industry, particularly for interior applications in the automotive industry.

12 Claims, No Drawings

POLYPROPYLENE IMPACT COPOLYMERS WITH REDUCED EMISSION OF VOLATILES

CROSS REFERENCE TO RELATED APPLICATIONS

This is the U.S. National Stage of International Application No. PCT/IL2018/051151, filed Oct. 28, 2018, which was published in English under PCT Article 21(2), which in turn claims the benefit of and priority to the earlier filing date of Israel Application No. 257637, filed Feb. 20, 2018.

FIELD OF THE INVENTION

The present invention relates to polypropylene formulations for the automotive industry, particularly the present invention relates to polypropylene impact copolymers with lowered volatiles emission for interior applications and to a method for producing them.

BACKGROUND OF THE INVENTION

Polypropylene (PP) impact copolymers, also called heterophasic polypropylene copolymers (HeCoPP), constitute important class of plastic materials, finding use in a wide range of application fields and still expanding scope of their utilization. Popularity of these materials is rooted in a beneficial cost-performance balance and in a high impact resistance even at subzero temperatures. The advantageous impact performance of HeCoPP is based on their unique structure. Regular HeCoPP are multiphase materials comprising elastomeric micron-size particles (usually ethylene-propylene rubber) finely dispersed within rigid matrix (usually PP homopolymer). Vast majority of commercial HeCoPP grades is produced via polymerization processes using Ziegler-Natta (Z-N) catalytic system.

HeCoPP polymers, keeping their well-balanced mechanical performance in a wide temperature interval between −40 and +60° C., are well accepted in the automotive industry. However, their use in the interior applications is limited by unacceptably high volatiles emissions. Since a passenger compartment of a car is a closed space of relatively small volume, volatile components, emitted from the plastic parts, can accumulate inside and cause significant problems. Well known as a general PP problem, volatiles emitted from PP materials can be divided into three categories, according to their volatility and negative impact: a) very volatile organic compounds (VVOC), providing odor that is an organoleptic nuisance; b) volatile organic compounds (VOC), that raise a health problem; and c) semi-volatile organic compounds (SVOC), raising a safety problems of fogging windshields from inside (these compounds may evaporate during hot daytime and condense on windshields at night; this component of volatiles emissions is usually reported as FOG). Numerous methods are used for evaluating the volatiles emissions. The most practical are German standards VDA277 (measuring total organic carbon TOC by headspace gas chromatography) and VDA278 (measuring VOC and SVOC-FOG by GC-MS with thermo-desorption). Total amount of volatile compounds that can emit from PP depends on its molecular weight (MW) and molecular weight distribution (MWD). Lower MW and broader MWD usually increase volatiles content in the polymer, but polymers with higher flow and lower MW are often needed. The problem is still worse with impact copolymers. The presence of the rubber particles reduces the melt flow rate (MFR) under the desired values. It is, therefore, difficult to achieve sufficiently high MFR in the impact copolymers while simultaneously keep volatiles emissions at acceptably low levels. It is possible, however, to increase the MFR of ex-reactor Oust polymerized) HeCoPP by visbreaking in a discharge extruder, for example by employing organic peroxides. This technique results in MWD narrowing and in decreasing the VOC and SVOC contents; unfortunately, the peroxide decomposition leads to an increased content of VVOC. Moreover, achieving sufficiently high final flow, when starting from the low ex-reactor MFR, would require deep visbreaking, which results in significant deterioration of mechanical properties—since both stiffness and impact resistance suffer from peroxide-induced chain scission. Thus, HeCoPP visbroken from low MFR to high-flow copolymers exhibits a significant loss of stiffness and impact performance, sometimes to an extent precluding their use in demanding automotive applications.

Most PP in automotive interiors is used in formulations containing fillers, fibers and other additives. While some polymerization-born volatiles (mainly VVOC) can be partially removed in the compounding step, other volatiles are introduced at the same time with the additives. Ultimately, removal of the volatiles originating from polymerization (VOC and especially SVOC) is very challenging and, in fact, SVOC component cannot be efficiently removed. Therefore, new approaches are strongly desired, allowing commercial production of high flow impact copolymers with good stiffness—impact balance, and the lowest possible VOC and SVOC contents, for automotive compounding. Recently new polymerization technology for polypropylene production has been introduced, based on metallocene catalysts. These catalysts produce polymers with extremely narrow MWD and extremely low volatiles content even at high melt flow rates. Unfortunately, polypropylene heterophasic copolymers produced with metallocene catalysts are not commercially available until now. One way to utilize the advantages of metallocene polypropylene is its blending with polymers which have good impact resistance.

EP 1988122 relates to a blend for use in automobile applications, characterized by a low VOC, containing a metallocene polypropylene (m-PP) and up to 50% elastomer. However, for such blend of m-PP and elastomer, inferior stiffness/impact balance is expected in comparison with reactor made HeCoPP. Stiffness may be improved by adding talc to the mixture. EP 1364760 relates to PP granules obtained via firstly impregnating long glass fibers with high MFR molten polypropylene, then coating the impregnated fibers with low MFR molten PP, both PP being PP homopolymers (PPH), followed by cutting the strand into granules. PPH, impregnating the fibers, has MFR at least 2 times higher than PP coating the already impregnated fibers. Using the low MFR coating polymer reduces emissions and also the resulting MFR of the composition. EP 2108679 describes a blend of m-HoPP with a polyolefin elastomer and a filler, resulting in reduced TOC. US 2010/0324225 describes Z—N, optionally heterophasic PP, visbroken with cyclic peroxide, demonstrating 30% reduction in TOC and increased MFR. However, taking into account that cyclic peroxides are usually available diluted with hydrocarbon diluent, use of cyclic peroxide is expected to increase SVOC content in the final composition. WO 2015/138300 describes modified HeCoPP composition with increased melt flow rates, impact strength and clarity, obtained via melt mixing of a polyolefin composition, having at least two phases, with a peroxide and a compatibilizer characterized by at least one nitroxide radical and at least one unsaturated bond capable of undergoing a radical addition reaction. Examples include compositions comprising polypropylene homopolymer continuous phase and a finely dispersed phase of ethylene-propylene rubber (EPR) particles. The nitroxide radical does not contribute to visbreaking but, on the contrary, acts as a radical scavenger; therefore nitroxide is used only in combination with peroxide. WO 2009129873, WO 2015075054, and WO 2015075088 disclose PP compositions with reduced emissions prepared with Z—N catalytic system including a special internal donor. WO 2015121160 describes a glass-fiber reinforced compound based on m-PP random copolymer (m-RaCoPP), exhibiting low emission levels, but m-RaCoPP lacks a rubber phase and therefore will show an inferior impact performance at subzero temperatures. WO 2015150042 describes a method of preparing a low emission Z—N PP, including visbreaking and devolatilization, but the latter operation increases operational costs and seems to be inefficient. WO 2016066453 discloses Z—N HeCoPP produced with non-phthalate internal donor and with addition of nucleating agent, resulting in reduced TOC value.

It is therefore an object of this invention to provide a polypropylene (PP) impact heterophasic copolymer (HeCoPP) exhibiting the emission of highly and medium volatile substances, measured as VOC content according to VDA278 standard, of at most 250 ppm.

It is another object of this invention to provide a polypropylene (PP) impact heterophasic copolymer (HeCoPP) exhibiting the emission of low volatile substances, measured as FOG content according to VDA278 standard, of at most 500 ppm.

Other objects and advantages of present invention will appear as the description proceeds.

SUMMARY OF THE INVENTION

This invention provides a polypropylene impact copolymer composition (PIC) with reduced emission of volatiles, produced by melt blending, comprising i) a Ziegler-Natta-prepared heterophasic polypropylene copolymer (HeCoPP) having a rubber content of between 15% and 40%, in an amount of from 35% to 75%; ii) a metallocene-prepared polypropylene homopolymer (m-PPH), in an amount of from about 25% to about 65%; and iii) a chain length modifier (CLM); wherein said emission is at most 250 ppm when measured as VOC emission according to VDA278 standard. Wherever "%" is mentioned, the weight percent is intended. Said amount in % relates to weight percent based on all polymer components. The PIC of the invention comprises said three components, HeCoPP with m-PPH and CLM, mixed in molten state, resulting in visbreaking said HeCoPP and m-PPH. In some preferred embodiments, the PIC consists of a polymer component comprising 35-75% HeCoPP and 25-65% of m-PPH, up to 1% of CLM, and up to 30% additives. During the melt blending of the composition, the CLM decomposes, forming free radicals. The radicals cause polymer chains scission, resulting in increase of the melt flow rate (MFR), so that the final PIC does not contain CLM, but can contain its decomposition products. In one embodiment, the composition of the invention preferably comprises nitroxide CLM. Nitroxide CLMs are known in the art and commercially available as a masterbatch on the polypropylene resin carrier (for example, Irgatec CR76 of BASF). The action of nitroxide CLM was described (for example in Alexandros Psarreas, Costas Tzoganakis, Neil McManus and Alexander Penlidis, Nitroxide mediated controlled degradation of polypropylene, Polym. Eng. Sci., 47:12 (2007) 2118-2123). In another embodiment, the composition of the invention comprises peroxide CLM. Said additives are selected from fillers, elastomers, antioxidants, UV stabilizers, metal deactivators, colorants, nucleating agents, antistatic and mold release agents, and additional chain length modifiers. The amount of fillers or elastomers may be in some cases up to 25% or 30%. In one embodiment, the amount of the additives may be up to 5% based on the weight percent of all polymer components; in some embodiments, the additives may constitute up to 1%. The PIC of the invention preferably exhibits FOG emission according to VDA278 standard of at most 500 ppm. The PIC of the invention preferably exhibits MFR higher than 40 dg/min, most preferably higher than 50 dg/min, such as 65 or higher; in some embodiments, the PIC of the invention exhibits MFR of between about 40 and about 65 dg/min, in other embodiments, the PIC of the invention exhibits MFR of between 25 and 60 dg/min.

The invention provides a process for manufacturing a polypropylene impact copolymer (PIC) with reduced emission of volatiles, comprising steps of i) providing a Ziegler-Natta-prepared heterophasic polypropylene copolymer (HeCoPP) having a rubber content of between 15% and 40%; ii) providing a metallocene-prepared polypropylene homopolymer (m-PPH); iii) providing a chain length modifier (CLM); iv) feeding into a twin-screw extruder, via gravimetric feeders, said HeCoPP, m-PPH, and CLM, optionally with additives selected from fillers, elastomers, antioxidants, UV stabilizers, metal deactivators, colorants, nucleating agents, antistatic and mold release agents, and additional chain length modifiers, in respective amounts of HeCoPP, m-PPH and CLM of 35-75%, 25-65% and 0.01-1.0%, and blending the components at a temperature of 200-290° C.; and v) pelletizing and drying the blend formed in step iv, thereby obtaining said PIC. Said components may be fed into a twin-screw extruder in any combinations, including dry blends. Said additives, and said CLM may be provided as masterbatches or concentrates on a polymer or other carrier. In one embodiment of the process according to the invention, said CLM comprises at least one peroxide. In a preferred embodiment of the process according to the invention, said CLM comprises at least one nitroxide. The PIC obtained by the process preferably exhibits the following properties: VOC emission according to VDA278 standard of at most 250 ppm, FOG emission according to VDA278 standard of at most 500 ppm, and MFR greater than 40 dg/min.

DETAILED DESCRIPTION OF THE INVENTION

It has now been found that polypropylene impact copolymer with acceptable combination of stiffness-impact balance, flow rate and volatile emissions can be obtained in a composition of heterophasic polypropylene copolymer by replacing its part with a metallocene-prepared polypropylene homopolymer, followed by visbreaking with radicals, originating from organic peroxides or nitroxides, preferably nitroxide-based radicals.

Blending heterophasic polypropylene copolymer with metallocene polypropylene homopolymer does not change the nature and structure of HeCo—PP as a two-phase system, comprising rubber particles finely distributed in the homopolymer matrix. Such blending, however, modifies the homopolymer matrix of HeCo—PP and affects molecular weight and molecular weight distribution of the matrix and mean particle size of the rubber phase. Simultaneous visbreaking by means of CLM in the course of such blending can further affect molecular weight distribution of both phases and rubber particle size. It was surprisingly found that melt mixing of Z—N HeCo—PP with m-PPH and CLM does not strongly deteriorate the mechanical properties of the resulting HeCo—PP, while reducing significantly volatiles emissions in comparison with ex-reactor Z—N HeCo—PP of similar MFR and rubber content.

The current invention relates to Z—N HeCoPP with reduced volatiles emission, acceptable in terms of VDA278 standard. The important feature of the invention is a partial substitution of the matrix phase of HeCoPP with m-HoPP, with simultaneous dilution of the rubber phase to the desired concentration, and increasing melt flow rate to the desired value. In doing so, the desired mechanical properties are achieved without need of elastomer addition, and also without need of an inorganic filler. This modification is effected in a twin-screw extruder, by mixing Z—N HeCoPP with m-HoPP in the presence of CLM. The novel heterophasic copolymer composition is obtained by blending Z—N HeCoPP exhibiting high MW and high rubber content with low-MW m-HoPP, and with a chain length modifier, whereby obtaining a composition of the desired MFR, mechanical properties and emission levels.

Visbreaking of polymer blends is a non-trivial process, since the chain length modifier may attack different components of the mixture with different efficiency, inducing different degree of chain scission on one hand, while, on the other hand, possibly modifying the chains by grafting reactions. Hence, the overall effect of visbreaking on mechanical properties of polymer blend is unpredictable and usually results in inferior mechanical properties, whereas both stiffness and impact resistance decrease. Unexpectedly, visbreaking of the instant blend of 35-75% Z—N HeCoPP and 65-25% m-HoPP with 0.01-0.1% peroxide or 0.1-0.5% nitroxide, in the course of intimate melt mixing, resulted in advantageous balance of mechanical properties, good stiffness and impact resistance, with desired MFR and with acceptable levels of volatiles. The parameters compare well with heterophasic copolymers of similar rubber content and MFR.

Polymerization MW of the Z—N HeCoPP matrix should be sufficiently high in order to reduce its contribution to the volatiles emission. Correspondingly, the MFR of Z—N HeCoPP should be below 20 dg/min, preferably below 15 dg/min, most preferably below 5 dg/min. Rubber content of the Z—N HeCoPP should be as high as possible, in order to keep reasonable impact resistance after diluting with the m-HoPP: 15-40%, preferably 20-35%, most preferably 25-30%. MW of the m-HoPP should be sufficiently low in order to facilitate achieving the desired final high MFR using minimum amount of chain length modifier, in terms of MFR it should be above 60 dg/min, preferably above 100 dg/min, most preferably 120-160 dg/min. Extremely high MFR of m-HPP (above 200 dg/min) should be avoided, since it may cause inhomogeneity of the matrix phase and uneven rubber particles distribution, resulting in inferior mechanical properties.

The amount of Z—N HeCoPP component in the blend should be at least 35%, to assure enough rubber phase content for reasonable impact performance, such as about 40% or about 45% or about 50% or about 55% or about 60% or about 65% or about 70% or about 75%. The amount of m-PPH component should be at least 25%, to assure reasonably low emission level and reasonably high final MFR after visbreaking, such as about 30% or about 35% or about 40% or about 45% or about 50% or about 55% or about 60% or about 65%. Chain length modifiers are chemical compounds, generating free radicals upon decomposition at the temperature of melt mixing. A variety of modifiers are known, including peroxides or nitroxides, or compositions comprising them. The best known in the art chain length modifiers are organic peroxides, but preferred in this invention are chain scission agents of nitroxyl radical (NOR) chemistry, for example comprising sterically hindered hydroxylamine esters. Commercially available agents of this type may be used, for example Irgatec CR76 from BASF. Required amount of chain length modifier depends on initial MFR of the components, desired final MFR, type of the modifier and its efficiency. As compared with peroxides, modifiers based on NOR chemistry require higher loading to achieve the same MFR, but are advantageous from the organoleptic point of view (less odor in the final blend). Compositions prepared according to the invention may optionally contain fillers (talc, short and long glass fibers, wollastonite, etc), elastomers, antioxidants, UV stabilizers, metal deactivators, colorants, nucleating agents, antistatic and mold release agents, and other additives. The below examples direct to some of the compositions according to the invention, and they demonstrate some of their properties, also in comparison with conventional materials.

It is important for the desired properties of the compositions according to the invention that m-PPH be compounded with a polypropylene copolymer already comprising an elastomeric components as created in a reactor; in other words, the elastomeric component is not admixed into the PP during a post-reactor extruder blending. Usually, the instant method employs HeCoPP produced by a two-stage polymerization process, in two reactors in series, whereas the PP matrix being produced by polymerization of propylene in the first reactor, and the EPR (ethylene-propylene rubber) being produced inside the matrix by polymerizing propylene and ethylene on the same catalyst in the second reactor. The process refrains from using commercial elastomers and limits compounding operations. The whole process may be preferably performed in a polypropylene production plant, including at least two polymerization reactors in series and a discharge extruder. Of course, m-PPH may be obtained as a commercial product. The instant process is cost-effective, and generally it is significantly cheaper than other processes providing impact resistant blends for automobile industry with acceptable volatile emissions.

The invention provides PP impact copolymers with reduced emission of volatile organic compounds (VOC), the product is manufactured from Ziegler-Natta based heterophasic PP copolymer (Z—N HeCoPP) in an amount of 35-75% in the initial blend, such as 40-70%, and metallocene homoPP (m-HoPP) in an amount of 25-65%, such as 30-60%; the blend comprises at least one chain length modifier, preferably comprising at least one peroxide or at least one nitroxide, and additives. No pure elastomers are added to the blend, and usually a single pass in one twin-screw extruder is needed to compound the mixture. The invention provides a process for manufacturing PP impact copolymers with reduced emission of volatile organic compounds (VOC), comprising a) providing Ziegler-Natta-based heterophasic PP copolymer in an amount of 35-75% in the initial blend, such as 40-70%, and metallocene homoPP (m-HoPP) in an amount of 25-65%, such as 30-60%; b) blending at a temperature of 200-290° C. in a twin screw extruder with additives and with at least one chain length modifier, preferably comprising at least one nitroxide, and c) drying the extruded pellets.

The invention will be further described and illustrated by the following examples.

EXAMPLES

Example 1

The following components are employed in the examples:
Z—N PPC1: heterophasic copolymer produced with Ziegler-Natta catalyst, having MFR 3.5 dg/min, rubber content 24%, matrix MFR 12 dg/min.
Z—N PPC2: heterophasic copolymer produced with Ziegler-Natta catalyst, having MFR 5 dg/min, rubber content 30%, matrix MFR 15 dg/min.
Z—N PPC3: a comparative Ziegler-Natta impact copolymer with MFR 65 dg/min (visbroken with peroxide), rubber content 20%.
m-PPH: a metallocene PP-homopolymer, MFR 140 dg/min, available from Total (MH140CN0).
Peroxide 101: 2,5-bis(tert-butyl peroxy)-2,5-dimethyl hexane.
NOR chain length modifier: Irgatech CR76, commercially available from BASF.
Nucleating agent NA71: available from Adeka Palmarol.
Irganox B225: an antioxidant, available from BASF.
Calcium stearate: an acid scavenger, available from Faci.
Competition: a commercial heterophasic copolymer, claimed as a low-emission grade.

The final compositions were prepared as described herein below. Metallocene PP-homopolymer (in the pellets form) was fed into twin-screw extruder via gravimetric feeder. Dry blend, containing Z—N PPC (in the reactor powder form) with liquid peroxide 101, nucleating agent, antioxidant and calcium stearate was prepared in the batch mixer and then fed into the same twin screw extruder via another gravimetric feeder. In another embodiment Irgatec CR76 pellets replaced liquid peroxide. Twin-screw extruder used was Berstorff ZE25 co-rotating laboratory compounder, equipped with two 25-mm screws with L:D ratio 40. The components were mixed in the twin-screw extruder at 270° C. and 200 rpm with throughput 5 kg/h and pelletized using three-hole die and strand pelletizer. Pellets of the final material were dried and injection molded for mechanical testing using standard ISO mold at melt temperature 220° C. and mold temperature 40° C. MFR was measured using Ceast automatic melt flow rate instrument at 230° C. and 2.16 kg, according to ISO 1133. Mechanical tests were performed using Zwick universal testing machine (flexural modulus according to ISO 178) and Ceast impact tester (Izod notched impact resistance according to ISO 180). Emissions were measured according to VDA278 standard using Perkin-Elmer GC-MS instrument, equipped with thermo-desorber unit. The described above procedure can be modified as understood by an expert. For example, Z—N PPC can be taken in the reactor powder form or in the pellets form; peroxide can be used in the form of concentrate, using porous polypropylene as a carrier. Nucleating agent, antioxidant and calcium stearate may be pre-blended and used as one pack.

The tables present experimental blends according to various embodiments, a comparative blend containing regular Z—N PPC and exhibiting similar MFR and ethylene content, as well as a commercially available (competitive) material exhibiting similar MFR and ethylene content. The unit "phr" (parts per hundred) corresponds to weight percent of all the polymer components. Amounts in ppm relate to the parts per million parts of all polymer components.

TABLE 1

Examples 1-4 comprise visbreaking with peroxide.

| Components | Units | Ex1 | Ex2 | Ex3 | Ex4 | Comparative | Competitive | |
|---|---|---|---|---|---|---|---|---|
| Z-N PPC1 | phr | 60 | 55 | | | | | |
| Z-N PPC2 | phr | | | 60 | 55 | | | |
| Z-N PPC3 | phr | | | | | 100 | | |
| m-PPH | phr | 40 | 45 | 40 | 45 | | | |
| Peroxide 101 | ppm | 500 | 500 | 500 | 500 | | | |
| NA71 | ppm | 400 | 400 | 400 | 400 | | | |
| Irganox B225 | ppm | 1200 | 1200 | 1200 | 1200 | | | |
| Ca Stearate | ppm | 500 | 500 | 500 | 500 | | | |
| Processing | | | | | | | | |
| Temperature | ° C. | 270 | 270 | 270 | 270 | | | |
| Screw speed | rpm | 200 | 200 | 200 | 200 | | | |
| Throughput | kg/h | 5 | 5 | 5 | 5 | | | |
| Properties | | | | | | | | |
| MFR | dg/min | 62.6 | 63.8 | 87 | 65 | 65 | 73.4 | |
| Flexural modulus | Mpa | 1470 | 1465 | 1390 | 1525 | 1200 | 1400 | |
| Izod notched @23° C. | kJ/m2 | 6.5 | 5.23 | 5.58 | 6.67 | 8 | 5.3 | |
| Izod notched @−20° C. | kJ/m2 | 4.3 | 3.98 | 3.99 | 3.43 | 5 | 3.8 | Limit |
| VDA278 VOC | ppm | 99 | 67 | 161 | 121 | 350 | 156 | 250 |
| VDA278 FOG | ppm | 254 | 166 | 280 | 254 | 840 | 466 | 500 |

TABLE 2

Examples 5-8 comprise visbreaking with nitroxide.

| Components | Units | Ex5 | Ex6 | Ex7 | Ex8 | Comparative | Competitive |
|---|---|---|---|---|---|---|---|
| Z-N PPC1 | phr | 40 | 45 | | | | |
| Z-N PPC2 | phr | | | 40 | 45 | | |
| Z-N PPC3 | phr | | | | | 100 | |
| m-PPH | phr | 60 | 55 | 60 | 55 | | |
| Irgatec CR76 | ppm | 3000 | 3000 | 3000 | 3000 | | |

TABLE 2-continued

Examples 5-8 comprise visbreaking with nitroxide.

| Components | Units | Ex5 | Ex6 | Ex7 | Ex8 | Comparative | Competitive | |
|---|---|---|---|---|---|---|---|---|
| NA71 | ppm | 400 | 400 | 400 | 400 | | | |
| Irganox B225 | ppm | 1200 | 1200 | 1200 | 1200 | | | |
| Ca Stearate | ppm | 500 | 500 | 500 | 500 | | | |
| Processing | | | | | | | | |
| Temperature | ° C. | 270 | 270 | 270 | 270 | | | |
| Screw speed | rpm | 200 | 200 | 200 | 200 | | | |
| Throughput | kg/h | 5 | 5 | 5 | 5 | | | |
| Properties | | | | | | | | |
| MFR | dg/min | 43.4 | 41.4 | 60.3 | 51.8 | 65 | 73.4 | |
| Flexural modulus | Mpa | 1530 | 1485 | 1485 | 1410 | 1150 | 1400 | |
| Izod notched @23° C. | kJ/m2 | 4.5 | 5.29 | 4.92 | 5.8 | 9 | 5.3 | |
| Izod notched @−20° C. | kJ/m2 | 2.85 | 3.57 | 2.89 | 3.77 | 5 | 3.8 | Limit |
| VDA278 VOC | ppm | 87 | 81 | 144 | 75 | 350 | 156 | 250 |
| VDA278 FOG | ppm | 366 | 319 | 384 | 469 | 840 | 466 | 500 |

TABLE 3

Comparative examples 9-12 comprise visbreaking with peroxide;
lower concentrations of m-PPH result in higher emission levels.

| Components | Units | Ex 9 | Ex 10 | Ex 11 | Ex 12 | Comparative | Competitive | |
|---|---|---|---|---|---|---|---|---|
| Z-N PPC1 | phr | 85 | 90 | | | | | |
| ZX-N PPC2 | phr | | | 85 | 90 | | | |
| ZX-N PPC3 | phr | | | | | 100 | | |
| m-PPH | phr | 15 | 10 | 15 | 10 | | | |
| Peroxide 101 | ppm | 700 | 700 | 700 | 700 | | | |
| NA 71 | ppm | 400 | 400 | 400 | 400 | | | |
| Irganox B225 | ppm | 1200 | 1200 | 1200 | 1200 | | | |
| Ca Stearate | ppm | 500 | 500 | 500 | 500 | | | |
| Processing | | | | | | | | |
| Temperature | ° C. | 270 | 270 | 270 | 270 | | | |
| Screw speed | rpm | 200 | 200 | 200 | 200 | | | |
| Throughput | kg/h | 5 | 5 | 5 | 5 | | | |
| Properties | | | | | | | | |
| MFR | dg/min | 41.7 | 35 | 48 | 41.9 | 65 | 73.4 | |
| Flexural modulus | Mpa | 1147 | 1099 | 1033 | 1008 | 1200 | 1400 | |
| Izod notched @23° C. | kJ/m2 | 7.5 | 8.4 | 8.1 | 11 | 8 | 5.3 | |
| Izod notched @−20° C. | kJ/m2 | 5.2 | 5.9 | 6.7 | 8.9 | 5 | 3.8 | Limit |
| VDA278 VOC | ppm | 320 | 325 | 315 | 340 | 350 | 156 | 250 |
| VDA278 FOG | ppm | 628 | 712 | 581 | 599 | 840 | 466 | 500 |

TABLE 4

Comparative examples 13-16 comprise visbreaking with nitroxide;
lower concentrations of m-PPH lead to high emissions level.

| Components | Units | Ex 13 | Ex 14 | Ex 15 | Ex 16 | Comparative | Competitive |
|---|---|---|---|---|---|---|---|
| Z-N PPC1 | phr | 85 | 90 | | | | |
| ZX-N PPC2 | phr | | | 85 | 90 | | |
| ZX-N PPC3 | phr | | | | | 100 | |
| m-PPH | phr | 15 | 10 | 15 | 10 | | |
| Irgatec CR76 | ppm | 4000 | 4000 | 4000 | 4000 | | |
| NA 71 | ppm | 400 | 400 | 400 | 400 | | |
| Irganox B225 | ppm | 1200 | 1200 | 1200 | 1200 | | |
| Ca Stearate | ppm | 500 | 500 | 500 | 500 | | |
| Processing | | | | | | | |
| Temperature | ° C. | 270 | 270 | 270 | 270 | | |
| Screw speed | rpm | 200 | 200 | 200 | 200 | | |
| Throughput | kg/h | 5 | 5 | 5 | 5 | | |
| Properties | | | | | | | |
| MFR | dg/min | 36 | 30 | 32 | 28 | 65 | 73.4 |
| Flexural modulus | Mpa | 1291 | 1291 | 1197 | 1170 | 1200 | 1400 |
| Izod notched @23° C. | kJ/m2 | 12.5 | 13.8 | 46.9 | 49.7 | 8 | 5.3 |

TABLE 4-continued

Comparative examples 13-16 comprise visbreaking with nitroxide;
lower concentrations of m-PPH lead to high emissions level.

| Components | Units | Ex 13 | Ex 14 | Ex 15 | Ex 16 | Comparative | Competitive | |
|---|---|---|---|---|---|---|---|---|
| Izod notched @−20° C. | kJ/m2 | 8.1 | 8.4 | 11.6 | 12.4 | 5 | 3.8 | Limit |
| VDA278 VOC | ppm | 310 | 328 | 320 | 390 | 350 | 156 | 250 |
| VDA278 FOG | ppm | 507 | 560 | 603 | 583 | 840 | 466 | 500 |

TABLE 5

Comparative examples 17-20 comprise visbreaking with peroxide and nitroxide; lower concentrations
of Z-N PPC result in inferior mechanical (impact resistance) performance.

| Components | Units | Ex17 | Ex18 | Ex19 | Ex20 | Comparative | Competitive | |
|---|---|---|---|---|---|---|---|---|
| Z-N PPC1 | phr | 15 | 15 | | | | | |
| Z-N PPC2 | phr | | | 15 | 15 | | | |
| Z-N PPC3 | phr | | | | | | | |
| m-PPH | phr | 85 | 85 | 85 | 85 | | | |
| Irgatec CR76 | ppm | | 4000 | | 4000 | | | |
| Peroxide 101 | ppm | 500 | | 500 | | | | |
| NA71 | ppm | 400 | 400 | 400 | 400 | | | |
| Irganox B225 | ppm | 1200 | 1200 | 1200 | 1200 | | | |
| Ca Stearate | ppm | 500 | 500 | 500 | 500 | | | |
| Processing | | | | | | | | |
| Temperature | ° C. | 270 | 270 | 270 | 270 | | | |
| Screw speed | rpm | 200 | 200 | 200 | 200 | | | |
| Throughput | kg/h | 5 | 5 | 5 | 5 | | | |
| Properties | | | | | | | | |
| MFR | dg/min | 92 | 65 | 83 | 54 | 65 | 73.4 | |
| Flexural modulus | Mpa | 1670 | 1590 | 1630 | 1579 | 1200 | 1400 | |
| Izod notched @23° C. | kJ/m2 | 3.2 | 2.8 | 3.6 | 3.5 | 8 | 5.3 | |
| Izod notched @−20° C. | kJ/m2 | 1.6 | 1.4 | 1.8 | 1.7 | 5 | 3.8 | Limit |
| VDA278 VOC | ppm | 29 | 26 | 26 | 29 | 350 | 156 | 250 |
| VDA278 FOG | ppm | 120 | 117 | 160 | 130 | 840 | 466 | 500 |

The experiments show either too high emissions or too low impact resistance, if the ratios are outside the ranges in accordance with the invention.

While the invention has been described using some specific examples, many modifications and variations are possible. It is therefore understood that the invention is not intended to be limited in any way, other than by the scope of the appended claims.

The invention claimed is:

1. A polypropylene impact copolymer composition (PIC) with reduced emission of volatiles, comprising:
   i) a Ziegler-Natta-prepared heterophasic polypropylene copolymer (HeCoPP) having an ethylene-propylene rubber content of between 15% and 40%, in an amount of from 40% to 70%;
   ii) a metallocene-prepared polypropylene homopolymer (m-PPH), in an amount of from about 30% to 59%; and
   iii) a chain length modifier (CLM) in an amount of from 0.01 to 1%;
   said three components being mixed in molten state, resulting in visbreaking said HeCoPP and m-PPH, wherein said emission of volatiles is at most 200 ppm when measured as VOC content according to VDA278 standard.

2. The PIC of claim 1, consisting of a polymer component comprising 40-70% HeCoPP, 30-59% of m-PPH, up to 1% of CLM, and additives.

3. The PIC of claim 1, wherein said CLM comprises at least one peroxide.

4. The PIC of claim 1, wherein said CLM comprises at least one nitroxide.

5. The PIC of claim 2, wherein said additives are selected from fillers, elastomers, antioxidants, UV stabilizers, metal deactivators, colorants, nucleating agents, antistatic and mold release agents, and additional chain length modifiers.

6. The PIC of claim 1, exhibiting FOG content according to VDA278 standard of at most 500 ppm.

7. The PIC of claim 1, exhibiting MFR greater than 40 dg/min.

8. A process for manufacturing a polypropylene impact copolymer composition (PIC) with reduced emission of volatiles, comprising steps of:
   i) providing a Ziegler-Natta-prepared heterophasic polypropylene copolymer (HeCoPP) having an ethylene-propylene rubber content of between 15% and 40%;
   ii) providing a metallocene-prepared polypropylene homopolymer (m-PPH);
   iii) providing a chain length modifier (CLM);
   iv) gravimetrically feeding into a twin-screw extruder components including said HeCoPP, said m-PPH, and said CLM in respective amounts of 40-70%, 30-59%, and 0.01-1.0% to produce a blend; and
   v) cooling, pelletizing and drying the blend formed in step iv, thereby obtaining said PIC;
   wherein said components are mixed in molten state, resulting in visbreaking said HeCoPP and said m-PPH and in attaining emission of volatiles of at most 200 ppm when measured as VOC content according to VDA278 standard.

9. The process of claim 8, wherein said CLM comprises at least one peroxide.

10. The process of claim 8, wherein said CLM comprises at least one nitroxide.

11. The process of claim 8, wherein said PIC exhibits the following properties: VOC content according to VDA278 standard of at most 200 ppm, FOG content according to VDA278 standard of at most 500 ppm, and MFR greater than 40 dg/min.

12. The process of claim 8, wherein additives selected from fillers, elastomers, antioxidants, UV stabilizers, metal deactivators, colorants, nucleating agents, antistatic and mold release agents, and additional chain length modifiers are added while blending at a temperature of 200-290° C.

* * * * *